United States Patent [19]

Andrus

[11] 4,004,994
[45] Jan. 25, 1977

[54] ELECTROCHEMICAL REMOVAL OF CONTAMINANTS

[75] Inventor: Joseph M. Andrus, Park Ridge, Ill.

[73] Assignee: Stauffer Chemical Company, Westport, Conn.

[22] Filed: May 16, 1974

[21] Appl. No.: 470,421

Related U.S. Application Data

[63] Continuation of Ser. No. 271,082, July 12, 1972, abandoned.

[52] U.S. Cl. .............................. 204/149; 204/130; 204/152; 204/272; 204/275
[51] Int. Cl.² .......................................... C02B 1/82
[58] Field of Search .......... 204/149, 152, 130, 272, 204/275, 280

[56] References Cited

UNITED STATES PATENTS

| | | | |
|---|---|---|---|
| 3,457,152 | 7/1969 | Maloney, Jr. et al. | 204/131 |
| 3,616,356 | 10/1971 | Roy | 204/152 |
| 3,692,661 | 9/1972 | Shockcor | 204/149 X |
| 3,716,459 | 2/1973 | Salter et al. | 204/1 R |
| 3,755,114 | 8/1973 | Tarjanyi et al. | 204/149 X |
| 3,764,499 | 10/1973 | Okubo et al. | 204/149 X |

*Primary Examiner*—John H. Mack
*Assistant Examiner*—A. C. Prescott
*Attorney, Agent, or Firm*—William R. Robinson

[57] ABSTRACT

Apparatus and method for electrochemically removing ions and other contaminants from an aqueous liquid by passing the liquid to be treated into the base of a vertically disposed treatment zone, said zone being formed by a vertically disposed cylindrical electrode and at least one internal electrode which is axially disposed within said cylindrical electrode. The electrodes are connected to a source of direct current and have contained between them, in the treatment zone, a solid particulate bed forming a medium of low electrical conductivity through which the current passes while the liquid to be treated is passed into the base of the treatment zone with sufficient pressure to transport it upward through the treatment zone. The liquid, free of the ions or other contaminants sought to be removed, is then removed from the top of the treatment zone.

13 Claims, 2 Drawing Figures

ELECTROCHEMICAL REMOVAL OF CONTAMINANTS

This is a continuation of application Ser. No. 271,082 filed July 12, 1972 now abandoned.

BACKGROUND OF THE INVENTION

With increasing demand being made upon existing water supplies, conservation of these supplies becomes more important. Not only is it important to effect greater economy in the use of existing water supplies, but it also more and more necessary, as health, conservation and governmental restrictions become more stringent, to process spent or waste liquids prior to dumping them as effluents in sewers, rivers, lakes or other available disposal outlets.

Ammong the methods for the treatment of effluents proposed, electrolysis seems to present one of the best prospects for handling the large volummes of solutions generally encountered but studies of the electrolysis systems employed heretofore have shown that these are efficient in commercial use only for highly concentrates solutions and that they are not satisfactory in reducing pollutant ion concentrations down to the very low order or level required for most purposes.

In a conventional electrolytic cell, direct current is applied to spaced electrodes immersed in the solution undergoing treatment, and the electrical circuit of the system is completed solely through ionization of the solution and migration of the ions to the surfaces of the electrodes. Thus, the current in a conventional electrolytic cell is carried through the solution solely by ion migration. At the surface of the electrode, an electrical charge is transferred between the ions in solution and conductive electrode. At the anode, electrons are lost to the electrode, or oxidation occurs; at the cathode, electrons are gained from the electrode, or reduction occurs. The electrodes thus act as the catalytic surfaces on which the electrochemical reaction takes place, and the reaction is localized, i.e., takes place only at the electrode surfaces. Since the current or flow of electrons within the electrolyte is carried out by the ions, for any given fixed applied potential at the electrodes, the amount of current passing through the system is, in general, proportional to the concentration of the ions present in solution. Hence, as the ion content decreases, the current in the system also decreases, and since the reactions which occur at the electrode are dependent on the flow of electrons, it can be seen that the rate of the reactions decreases with decreasing concentrations. It is also obvious from the above that the resistance or resistivity of the electrolyte itself increases with decreasing concentration of ions present. Thus, for a fixed applied potential, in order to maintain a substantially constant rate of electron flow it would be necessary to decrease the distance between the electrodes as ion concentration decreases. This is generally impractical.

In order to overcome some of the drawbacks of conventional electrolytic cells, Belgian Pat. No. 739,684 and U.S. Pat. No. 3,616,356 disclose the use of bed formed of solid particulate electrically conductive packing elements, which bed has disposed therein at least two spaced electrodes making electrical contact with the packing elements. The composite bed and electrodes are supported in some suitably insulated treatment vessel to which the metal-containing solutions or other impure aqueous fluids to be treated are introduced while direct current of appropriate potential is applied to the electrodes from a suitable power source. Due to contact resistance of the packing elements and at the electrode surfaces, an electrical path of relatively low conductivity is established through the bed and there is produced in this system due to intermittency of contact a phenomenon known as bipolarity in the individual particulate packing elements, thus causing a multiplicity of positive and negative sites to exist within the bed. When a solution or moist gaseous stream containing metal ions is introduced into or passed through the electrically charged bed of the system, an electrochemical reaction occurs at each of such sites whereby positively charged ions are reduced and deposited on or at the negatively charged portion of the bed elements. Additionally, where metal ions are present, precipitation of such ions can and does occur within the vessel due to reaction with other ions whose concentration is influenced by the electrochemical action. Consequently, the metal ion concentration of the solution or gaseous stream can be reduced to a low level.

In practice, however, the processes described in Belgian Pat. No. 739,684 and U.S. Pat. No. 3,616,356 has certain limitations. Thus, the flow rate of the systems disclosed in these references is limited due to several hydraulic factors including (a) the tendency of the electrolyte to channel, i.e., seek paths of low flow resistance through the bed thereby reducing the bed efficiency, and (b) the tendency of the bed to become too tightly packed at greater flow rates thereby plugging the system and eventually causing shorting out through the bed material. As a result of these drawbacks, the efficiency of the system in terms of gallons of effluent treated per hour per cubic foot of bed is severely limited, i.e., normally up to about 15 gal./hr/cu. ft. of bed. This bed efficiency limitation makes it necessary to use larger beds, and consequently more and larger units, in order to treat large volumes of effluent having high contaminant concentrations. This situation is further aggravated by the fact that these systems cannot be improved beyond their hydraulic limitations by linking them in series. As a consequence the only effective method of treating large volumes is by employing a large number of units in parallel. This procedure is normally too costly for most commercial applications.

BRIEF DESCRIPTION OF THE INVENTION

In its broadest aspects, the present invention relates to a process and apparatus for electrochemically removing or destroying ions or other contaminants from an aqueous liquid. The apparatus embodiment of the present invention comprises a vertically disposed cylindrical electrode having axially disposed therein at least one internal electrode, thereby forming a vertical treatment zone between them, said treatment zone containing a solid particulate bed which forms a medium of low electrical conductivity between the electrodes. The electrodes are connected to a source of direct current. The apparatus is further provided with input means at the base of said treatment zone and output means at the top of said treatment zone to allow the ingress and egress of the liquid to be treated.

The process embodiment of the present invention is directed to removing or destroying ions or other contaminants contained in aqueous liquids by passing the liquid through a vertically disposed treatment zone formed by a cylindrical electrode and at least one internal electrode axially disposed within the cylindrical electrode, and containing a solid particulate bed which forms a medium of low electrical conductivity. A source of direct current is applied to the electrodes and sufficient current flows through the treatment zone by means of the bed to establish a condition of bipolarity in the particles of the bed.

In a particularly preferred embodiment, the present invention relates to an apparatus and method for eliminating hexavalent chromium ions from the effluent of metal finishing operations by passing said effluent through a vertically disposed treatment zone and thereby reducing the hexavalent chromium to trivalent chromium as will be described in greater detail hereinafter.

REFERENCE TO THE DRAWINGS

DETAILED DESCRIPTION OF THE DRAWINGS

Figure 1:
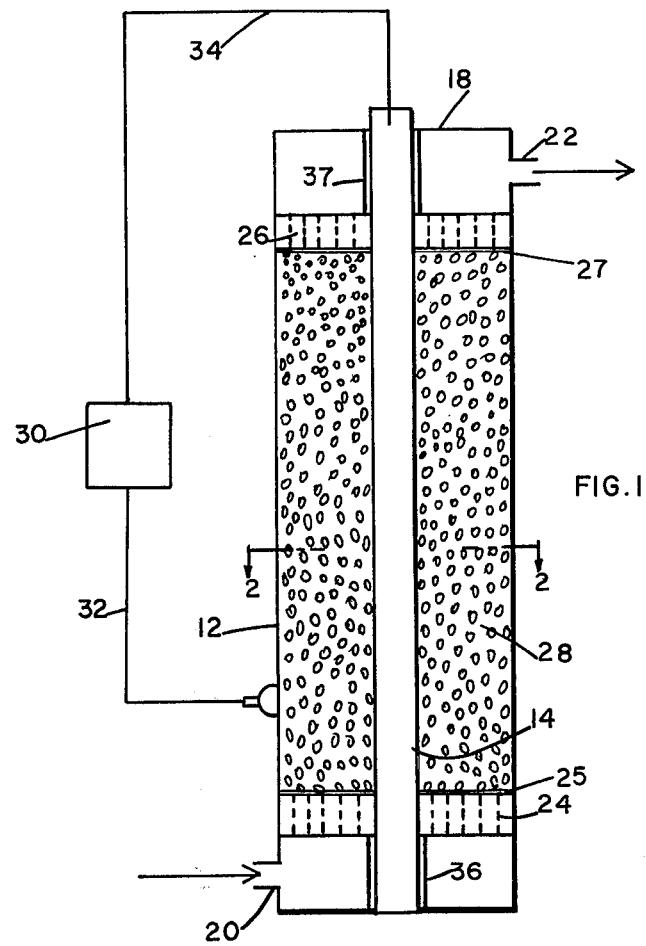
FIG. 1 is a cross-sectional elevation of an apparatus in accordance with the present invention.
Figure 2:
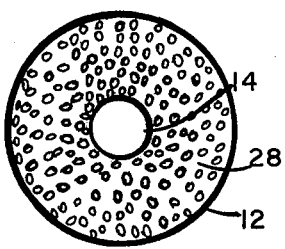
FIG. 2 is a top plan view of the apparatus of FIG. 1 taken along line 2—2 of FIG. 1.

Referring to the drawings and to FIGS. 1 and 2 in particular, a treatment apparatus for carrying out the present invention is shown. Two prominent parts of the apparatus are cylindrical electrode 12 which is disposed in a vertical plane and internal electrode 14, said internal electrode being axially disposed within said cylindrical electrode 12 such that the cylindrical electrode 12 encases it. The cylindrical electrode is fitted with base header 16 and top header 18, thereby forming a closed system except for input means 20 and output means 22 which are in open communication with the effluent stream to be treated and the treatment zone formed by the electrodes. Cylindrical electrode 12 is further fitted with perforated base diffuser plate 24 and perforated top diffuser plate 26, thereby forming a vertically disposed treatment zone bound peripherally by cylindrical electrode 12, base diffuser plate 24, top diffuser plate 26 and internal electrode 14. The diffuser plates 24 and 26 are necessarily constructed of a non-conductive material such as a polyvinyl chloride. Both diffuser plates 24 and 26 are fitted with retaining screens 25 and 27, which cover that portion of the diffuser plates 24 and 26 which face the treatment zone. The retaining screens should also be constructed of a non-conducting material and of a mesh size which is smaller than the bed particle size. The treatment zone so defined contains a solid particulate bed 28 which forms a medium of low electrical conductivity between the cylindrical electrode 12 and internal electrode 14. Cylindrical electrode 12 and internal electrode 14 are in electrical communication with direct current source 30 by means of electrode leads 32 and 34. Those portions of the internal electrode 14 extending beyond the treatment zone but within the confines of the cylindrical electrode 12 and the base header 16 at one end, and the cylindrical electrode 12 and the top header 18 at the other end, can be protected from interaction with the effluent by means of insulator sleeves 36 and 37.

FIG. 2 is a cross-sectional top plan view of the apparatus of FIG. 1 along line 2—2. Bed particles 28 are contained between cylindrical electrode 12 and internal electrode 14 in such a manner as to provide a medium of low electrical conductivity. The particulate bed is not so tightly packed, however, as to provide a direct circuit between the electrodes or so as to substantially hinder the upward flow of the liquid to be treated, as will be discussed hereinafter.

DETAILED DESCRIPTION OF THE INVENTION

The present invention relates to an improvement in the processes described in Belgian Pat. No. 739,694 and U.S. Pat. No. 3,616,356 in that by employing the process and apparatus of the present invention substantially greater efficiency in removal of inoic and other waste materials from aqueous effluent can be achieved over that achieved by employing the teaching of these references. This increase in efficiency is attributable to at least three factors. Firstly, while the particulate bed of the vertically disposed apparatus of the present invention exhibits the same bipolarity phenomenon found in the bed of the references, the upward flow of the effluent through the present apparatus has the beneficial effect of maintaining proper packing in the bed itself and preventing compaction; thereby effecting uniform particle distribution and preventing shorting through the bed. Secondly, the diffuser plates and the levitation of the bed due to the upward flow eliminate channelling of the effluent through the bed. Thirdly, the configuration of the electrodes in the appartus of the present invention makes it possible to employ current densities which allow for the greatest efficiency in removing inoic contaminants per unit amount of bed material. The total effect of these beneficial characteristics, is to increase the efficiency of the bed and consequently, allow the use of smaller and less costly units which are also easier to maintain. A further advantage of the present invention is that by eliminating the hydraulic limitations of the prior art systems, the units of the present invention can be linked in series to handle even greater flow rates than achievable by the individual units with a corresponding gain in contaminant removal.

The type of particles used as the bed media has substantial effect upon the operation of the system of the invention. The function of the particulate bed is to carry current between the electrodes in such manner as to create a condition of bipolarity in the particulate bed, i.e., a multiplicity of oppositely charged sites throughout the bed. In general, the particles should be chemically inert or insoluble in the solutions being processed so as to avoid contamination of the solution with dissolved media. Also, the contact resistance of the particles in the composite bed must be high enough to prevent direct short circuiting of the electrodes when the current is supplied to them. However the resistance should not be so high as to require excessively high voltage to produce the required current flow and individual particles bipolar effect mentioned above. Several types of material lend themselves to use as bed media, including cermet and powdered metal compacts, for example. The most practical and least expensive materials presently known however are carbonaceous, including carbon itself, charcoal, graphite and pelleted forms of such carbonaceous materials. The size and shape of the bed particles affect the system operation. Generally particles of uniform size and shape are far more efficient in the removal of the contaminating ions than irregularly sized and shaped particles. The reason for this lies in the fact that the upward flow of the effluent tends to cause aggregate separation between large and smaller particles, with the larger bed particles remaining at the bottom. This tends to decrease the efficiency of the bed in the lower portion of the column. Aggregate separation becomes less of a factor, of course, as bed particles or more uniform shape are employed. This difference can also attributed to the more pronounced bipolar effect of the bed media where uniform columnar particles are used, and greater number of reaction sites provided by such particles than in the case of the random shape particles.

The determination of the optimum particle size for a particular application will, of course be dependent upon the effluent flow rate used. If the particle size is too small for a particular flow rate the bed becomes too dense or compact, giving a very low total contact resistance between the electrodes. Because of this, current flow is quite high, resulting in the development of considerable heating of the solution due to the high wattage consumption. It would also seem logical to conclude that the tight packing or low contact resistance in this case could lead to shorting of the electrodes through the bed. This can be offset to a certain extent by increasing the flow of the effluent provided the bipolar state of the bed is maintained. On the other hand if the particles are too large in size the bed will have a relatively high total contact resistance between the electrodes, reducing the flow of current through the bed. For the same volume of fixed bed, the larger pellets will of course present fewer possibilities for bipolar sites. The determination of optimum size for a particular application can be easily made, however, without undue experimentation. For example, at an effluent flow rate of 50 gal./hr./cu. ft. of bed, the optimum particle size for most applications is from about 0.5 to about 4 mm, and preferably 1.0 to about 3.0 mm. in diameter.

In addition to the ready availability and low cost of carbonaceous materials as bed media, such materials have the advantage of virtually complete inertness to the reactions taking place in solution. An additional advantage is gained through the use of activated carbon type material which, because of its high adsorbency for organic materials, can also act as a mechanical filter or adsorbent should such organic contaminants be present in the solution.

The use of insoluble or inert packing elements such as the carbonaceous pellets mentioned affords the possibility for reclamation or reuse not only of the bed media itself but of the metal caused to deposit out on the media. For example, when the system is used to treat rinse water resulting from copper plating operations, the extracted metal builds on the cathodic portions of the packing elements as mentioned above and when the build-up of the metal reaches a level where it begins to adversely affect the overall resistance of the bed, the bed can be removed from the cylindrical electrode, placed in a suitable container and used anodically on the copper plating bath. The copper will thus be redissolved into the plating bath and reused for plating purposes.

Reduced metal may also be dissolved from the packing media through treatment with a suitable oxidizing agent, such as a strong acid, and collected in concentrated form for further processing or reuse. Such recovery can be carried out within the original treatment vessel itself, or in auxiliary equipment if the media is removed from the treatment vessel.

The material selected for use as the cylindrical electrode must necessarily be insoluble in the effluent and of sufficient strength to contain the bed and effluent being treated. The material should also preferably be non-corrodable by the effluent. While any conductive material fulfilling these requirements can be used, stainless steel has been found to be advantageous for most normal applications. The internal electrode can be made of any suitable conductive material and is preferably insoluble to prevent re-contamination of the effluent. For most applications carbon or graphite rods have been found to be suitable as the internal electrode.

The polarity of the electrodes is not critical and the cylindrical electrode can function as either the anode or the cathode. Since the two electrodes will vary in relative size, however, it can be beneficial to select the polarity of the electrodes depending upon the contaminant to be removed. Thus, in a system having a high cylindrical electrode to internal electrode surface area, a slightly increased cathodic effect can be given to the system by employing as the cathode the cylindrical electrode. This type of polarity will, of course, be beneficial in the removal of cationic contaminants such as hexavalent chromium. Conversely, where anionic contaminant, such as cyanide, is to be removed the bed can be given an increased anionic effect by making the larger cylindrical electrode the anode.

The size of the electrodes will depend upon the current density employed in the removed process. This of course will vary to a certain extent depending upon the effluent being treated and the contaminant being removed. For most systems, however, it has been found that the efficiency of the system drops off rapidly at current densities below about 10 amps/cu. ft. of particulate bed. The upper limit with respect to the current density is not critical and is controlled only by the economics of the components and the particular resistance of the system. For most normal applications current densities up to about 100 amps/cu. ft of particulate bed are more than sufficient.

The diffuser plates are necessarily constructed of a non-conductive material such as polyvinyl chloride to prevent shorting out of the electrodes. They should be so designed as to allow for maximum and even diffusion of the effluent across the cross-section of the particulate bed in order to prevent channelling in the bed. This can be accomplished by employing plates having a plurality of uniformly sized holes dispersed evenly across the surface of the plate. In order to facilitate flow, diffuser plates having holes larger than the bed particles can be employed by covering them with a suitable retaining screen having a mesh size smaller than the bed particle size. Like the diffuser plate, the retaining screen should be constructed of a non-conductive material such as polypropylene or the like. While the retaining screen will prevent the loss of bed particles through either of the diffuser plates, a certain amount of degraded particle fines will pass through the retaining screen and accumulate in the area between the base diffuser plate and the base header. Consequently, it may be preferable to include a flush valve which is in communication with the area bounded by the base header, cylindrical electrode and diffuser plate and which is located opposite the input means. Through this valve the fines can be periodically flushed with water or effluent which is then filtered and recycled.

The flow rate of the effluent must be controlled in such a manner that the bed does not become too packed or, at the other extreme, overly agitated. This of course will be determined by the amount of bed material present, size and spacing of the electrodes. For most applications employing particles of the range from 1 to 4 mm. in diameter, flow rates up to 50 gallons/hour/cu. ft. of bed material can be used. Where the effluent being treated contains high concentrations of contaminant but constitutes only a small volume, it may be beneficial to recycle the effluent at normal flow rates or use very slow flow rates. In the case of slow flow rates, adequate bed support can be maintained through air agitation or vibration.

The process of the present invention can be applied to solutions arising from operations in metal finishing, paper, milk, automotive, mining, leather tanning, pharmaceutical industry as well as to sewage and brackish water treatment. Metallic ions such as gold, silver, iron, zinc, tin, copper, nickel, cadmium, chromium, lead, and mercury can be readily removed from aqueous solutions by means of the processes and apparatus of the present invention. Likewise, non-metallic ionic contaminants such as chromate, cyanide and azide can also be removed by treating their effluent according to the present invention. A particularly preferred use of the present invention has been the reduction of hexavalent chromium to the relatively harmless trivalent form. This application is of particular interest in the metal finishing field since the wide use of chromium rinse as a seal for phosphate conversion coatings or after chrome plating and the consequent high $Cr^{115,6}$ effluent pose a substantial pollution problem.

In the reduction of hexavalent chromium to its trivalent state, it has been found that by employing the process of the present invention effluent containing 500 ppm. $Cr^{115,6}$ can be treated with greater than 95% reduction of $Cr^{115,6}$ to $Cr^{115,3}$ at flow rates of up to 50 gal./hr/cm. ft. of bed particles. These results are accomplished by employing particles in the range from about 0.5 to about 4.0 mm. in diameter and a current density greater than 10 amps/cu./ft. of bed particles. The preferred current density for $Cr^{115,6}$ reduction is normally in the range from about 15 to about 25 amps/cu. ft. of bed particles. The reduction of $Cr^{115,6}$ has been found to be pH dependent and a balancing between various factors must be sought. Thus while a pH below 1.5 increases current efficiency, it requires the use of an inordinant amount of acid to bring the pH down to that level and leads to destructive corrosion of the equipment employed. If the ph is above 3.0, a large amount of the reduced $Cr^{115,3}$ will precipitate onto the bed particles as chromium hydroxide. Consequently the most preferred pH range for $Cr^{115,6}$ reduction is from about 1.5 to about 2.5, since it is most advantageous to precipitate the $Cr^{115,3}$ after the effluent has been removed from the treatment zone. This, of course, can be accomplished by conventional methods.

The present invention will be further illustrated by the following examples.

EXAMPLE 1

An 18 inch vertical cylindrical plexiglass shell having an internal wall of 18-8 stainless steel and an internal diameter of 3.5 inches is fitted with two electrical terminals and an input and output port. A graphite rod having a ½ inch diameter is secured in the center of the cylinder. The cylinder is then filled with uniformly shaped carbon pellets having an average diameter of about 1.6 mm and a length ranging from 2 to 16 mm. The graphite rod is connected to the positive terminal of a d.c. power source and the stainless steel wall of the cylinder is connected to the negative terminal.

An aqueous solution containing 400 ppm of hexavalent chromium and having a pH of 1.7 is pumped through the base input port of cylinder at a rate of 50 gallons per hour per cubic ft. of bed material. The voltage source is adjusted so that a current density of 15 amps/cu. ft. of bed is established. The solution is tested at half-hour intervals for hexavalent chromium as it flows from the output port. The results are contained in Table I.

TABLE I

| $Cr^{+6}$ ppm in | $Cr^{+6}$ ppm out |
|---|---|
| 400 | 6 |
| 400 | 6 |
| 400 | 6 |
| 400 | 3 |
| 400 | 2 |

EXAMPLE 2

A treatment apparatus similar to that shown in FIG. 1 is constructed of a stainless steel cylinder having a height of 72 inches and an internal diameter of 15 inches. The internal electrode consists of a carbon rod having a diameter of 2 ½ inches. The rod differs from that shown in FIG. 1 in that it does not penetrate through the diffuser plates but is secured instead by tungsten bolts through the diffuser plate. One of the tungsten bolts also acts as an electric terminal. The diffuser plates is constructed of ½ inch thick polyvinyl chloride and has a plurality of ½ inch diameter holes scattered evenly across its surface at distance of 1 inch from center to center. The plates are covered by a polypropylene mesh having a mesh size less than 2.0 mm. The cylinder is then filled with approximately 7.4 cu. ft. of carbon cylinders having a diameter of 1.6 mm and a length ranging from 2 to 16 mm. The input port of the unit is attached to the effluent from a commercial chromate bright dip for electrodeposited zinc, and the effluent is pumped into the unit at the rate of 5 gallons per minute. The potential is set across the electrodes to establish a current density of approximately 20 amps/cu. ft. of bed. The effluent is monitored periodically over a 24 hour period and the results are contained in Table II.

TABLE II

| $Cr^{+6}$ ppm in | $Cr^{+6}$ ppm out | pH |
|---|---|---|
| 215 | 0.8 | 2.6 |
| 245 | 0.8 | 2.6 |
| 197 | 1.1 | 2.3 |
| 200 | 0.6 | 2.3 |
| 195 | 0.9 | 2.3 |
| 200 | 1.2 | 2.3 |
| 155 | 1.0 | 2.4 |

What is claimed is:
1. An apparatus for the removal of ionic contaminants for aqueous solutions which comprises:
 a. a vertically disposed cylindrical electrode;
 b. an internal electrode, axially disposed within said cylindrical electrode;
 c. a particulate bed comprising carbonaceous particles disposed between and in contact with said cylindrical electrode and said internal electrode, said particulate bed retained in disposition between said electrodes by retaining means thereby forming a medium of lower electrical conductivity between said electrodes;
d. a source of direct current which is in electrical communication with said cylindrical electrode and said internal electrode in such manner as to induce a potential difference between said electrodes across said bed;
e. a base header and a top header fitted over the ends of said cylindrical electrode thereby forming a closed system;
f. input means in open communication with the base of said cylindrical electrode such that the solution to be treated can be continuously introduced into said cylindrical electrode; and
g. output means in open communication with the top of said cylindrical electrode such that the treated solution can be continuously removed from said cylindrical electrode.

2. The apparatus of claim 1 wherein said particulate bed comprises carbonaceous particles.

3. The apparatus of claim 1 wherein said carbonaceous particles are from 0.5 to 4.0 mm. in diameter.

4. The apparatus of claim 1 which additionally contains a perforated base diffuser plate and a perforated top diffuser plate mounted within said cylindrical electrode thereby forming a treatment zone bounded peripherally by the cylindrical electrode, the base diffuser plate, the internal electrode and the top diffuser plate, said diffuser plates being constructed of a non-conducting material.

5. The apparatus of claimm 4 wherein the perforations in said diffuser plates are of uniform size and are uniformly distributed over the surface of said diffuser plates.

6. The apparatus of claim 5 which additionally contains a retaining screen fitted over each of the diffuser plates said screen having a mesh size less than the particle size of the particulate bed and being constructed of a non-conductive material.

7. A method of removing ionic contaminants from aqueous solution comprising:
a. continuously feeding said solution into the base of a vertical treatment zone formed by a vertically disposed cylindrical electrode and an internal electrode axially disposed within said cylindrical electrode, said treatment zone additionally containing a particulate bed comprising carbonaceous particles disposed between and in contact with said cylindrical electrode and said internal electrode, said particulate bed retained in disposition between said electrodes by retaining means thereby forming a medium of lower electrical conductivity between said electrodes, in such a manner that the solution rises vertically through said bed while applying an electrical potential across said bed sufficient to maintain a current density of at least 10 amps/cu. ft. of bed, and
b. continuously removing said solution from the top of said treatment zone.

8. The process of claim 7 wherein said carbonaceous particles have a diameter from about 0.5 to about 4.0 mm.

9. A method of reducing hexavalent chromium in an aqueous solution to its trivalent state which comprises:
a. continuously feeding said solution to a vertical treatment zone formed by a vertically disposed cylindrical electrode and an internal electrode axially disposed within said cylindrical electrode, said treatment zone containing a particulate bed comprising carbonaceous particles disposed between and in contact with cylindrical electrode and said internal electrode, said particulate bed retained in disposition between said electrodes by retaining means thereby forming a medium of lower electrical conductivity between said electrodes, in such a manner that the solution rises vertically through said bed while applying an electrical potential across said bed sufficient to maintain a current density of at least 10 amps/cu. ft. of bed, and
b. continuously removing said solution from the top of said treatment zone.

10. The process of claim 9 wherein said carbonaceous particles have a diameter from about 0.5 to 4.0 mm.

11. The process of claim 9 wherein the pH of the effluent is adjusted to a pH in the range from about 1.5 to about 2.5 prior to being fed into the treatment zone.

12. The process of claim 9 wherein said electrical potential is sufficient to maintain a current density in the range from about 15 to about 25 amps/cu. ft. of bed.

13. The process of claim 9 wherein said solution is fed into said treatment zone at a flow rate up to about 50 gal/hr./cu. ft. of bed.

* * * * *